No. 849,948. PATENTED APR. 9, 1907.
T. R. WALLIS.
COLTER BEARING.
APPLICATION FILED AUG. 1, 1906.
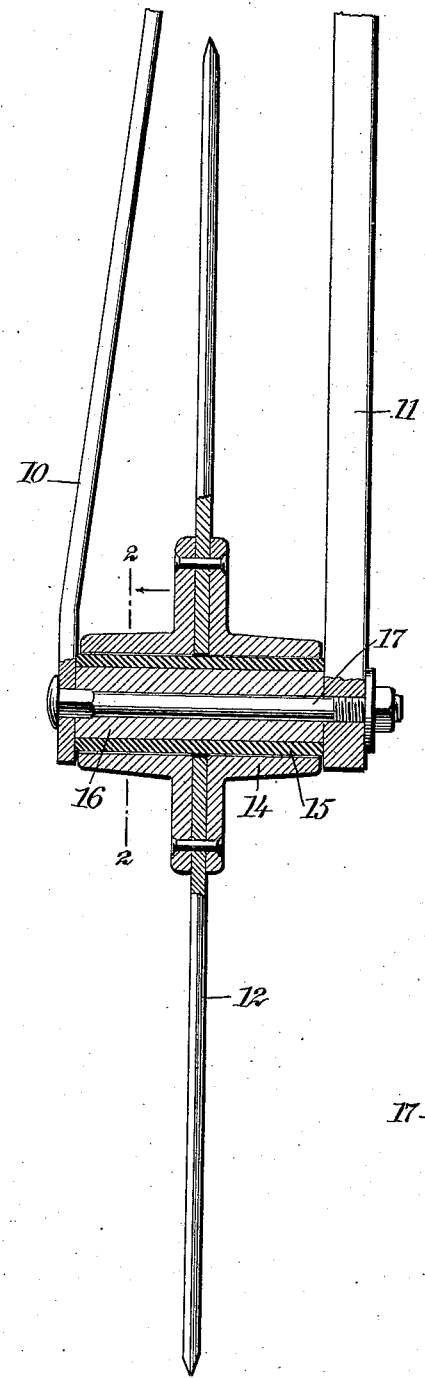
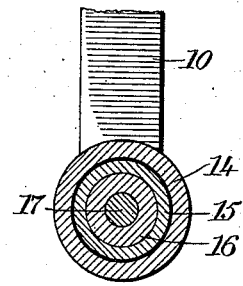
WITNESSES
INVENTOR
Thomas R. Wallis
BY
ATTORNEYS

UNITED STATES PATENT OFFICE.

THOMAS RILEY WALLIS, OF GREENVILLE, MISSISSIPPI.

COLTER-BEARING.

No. 849,948. Specification of Letters Patent. Patented April 9, 1907.

Application filed August 1, 1906. Serial No. 328,759.

*To all whom it may concern:*

Be it known that I, THOMAS RILEY WALLIS, a citizen of the United States, and a resident of Greenville, in the county of Washington and State of Mississippi, have invented a new and Improved Colter-Bearing, of which the following is a full, clear, and exact description.

The invention relates to an improved bearing for the colters of plows.

The object of the invention is to provide a bearing which will mount the metal hub of the colter-blade on a steel or other metal bearing and by means of which, however, said bearing is supported firmly and non-rotatively on the frame of the plow or other agricultural implement. This end I attain by certain special features of construction and relative arrangement of parts, all of which will be fully set forth hereinafter and particularly pointed out in the claim.

Reference is to be had to the accompanying drawings, which illustrate as an example the preferred embodiment of my invention, in which drawings—

Figure 1 is a sectional view of the invention, and Fig. 2 is a cross-section of the bearing on the line 2 2 of Fig. 1.

10 and 11 indicate the frame parts of the plow or other agricultural apparatus or machine, and 12 indicates the circular colter-blade. Said blade is arranged between the frame parts 10 and 11 and has a metallic hub 14 bolted or riveted to the blade, as shown. The hub 14 is mounted on a steel tube or bushing 15, so that the hub and blade may rotate freely on the bushing which forms the bearing for the colter. Said bushing has passed tightly through it a wooden sleeve 16, and through this sleeve a tie-bolt 17 passes, the tie-bolt extending through the parts 10 and 11 and serving to clamp said members against the bushing 15 and sleeve 16. In this manner the colter and its hub are mounted to turn on the steel or other metallic bushing 15, forming a secure bearing without unnecessary friction. At the same time the bushing or bearing 15 is securely sustained and prevented from rotating on the tie-bolt 17 by means of the sleeve 16, this sleeve being held with the bushing rigidly between the frame parts and the sleeve also serving to prevent vibration of the parts.

Having thus described the preferred form of my invention, what I claim as new, and desire to secure by Letters Patent, is—

In a colter-bearing, the combination with the spaced members of the frame, of the colter-wheel provided with a metallic hub projecting upon each side of the wheel, a metallic bushing upon which the hub may rotate, a wooden sleeve within the hub, and a bolt passing through the sleeve and the frame members, to tightly clamp said bushing and sleeve between said frame members, whereby to prevent rotation of the bushing and sleeve with respect to the frame said hub being of less length than said bushing and sleeve.

In testimony whereof I have signed my name to this specification in the presence of two subscribing witnesses.

THOMAS RILEY WALLIS.

Witnesses:
J. W. ATKINS,
D. HEBER JOHNSTON.